(12) United States Patent
Lee et al.

(10) Patent No.: US 9,888,146 B2
(45) Date of Patent: Feb. 6, 2018

(54) IMAGE FORMING APPARATUS AND METHOD FOR CONTROLLING THE SAME

(71) Applicant: S-PRINTING SOLUTION CO., LTD., Suwon-si (KR)

(72) Inventors: Sang-in Lee, Seoul (KR); Kellch Minamide, Tokyo (JP); Manabu Sasajima, Tokyo (JP); Byung-jun Sung, Seoul (KR); Eung-yul Lee, Seoul (KR); Seung-wook Jeong, Seoul (KR); Jung-ho Bang, Yongin-si (KR); Sayuri Suzuki, Tokyo (JP); Takeo Aoki, Tokyo (JP); Won-suk Chung, Seoul (KR); Fujimura Noriyuki, Seoul (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 14/737,747

(22) Filed: Jun. 12, 2015

(65) Prior Publication Data

US 2015/0365561 A1 Dec. 17, 2015

Related U.S. Application Data

(60) Provisional application No. 62/011,248, filed on Jun. 12, 2014.

(30) Foreign Application Priority Data

Mar. 27, 2015 (KR) ........................ 10-2015-0043228

(51) Int. Cl.
*H04N 1/387* (2006.01)
*H04N 1/00* (2006.01)

(52) U.S. Cl.
CPC ....... *H04N 1/3878* (2013.01); *H04N 1/00493* (2013.01); *H04N 1/00496* (2013.01);
(Continued)

(58) Field of Classification Search
CPC ............. H04N 1/3878; H04N 1/00493; H04N 1/00496; H04N 1/00551; H04N 1/00557; H04N 1/00564
(Continued)

(56) References Cited

U.S. PATENT DOCUMENTS

| | | | |
|---|---|---|---|
| 4,868,918 A | 9/1989 | Watanabe | |
| 5,920,758 A * | 7/1999 | Ohtsuki | H04N 1/00543 399/107 |

(Continued)

FOREIGN PATENT DOCUMENTS

| | | |
|---|---|---|
| GB | 2389734 | 12/2003 |
| JP | 2003-348286 | 12/2003 |
| WO | 03/079666 | 9/2003 |

OTHER PUBLICATIONS

Extended European Search Report dated Jan. 28, 2016 in European Patent Application No. 15171674.3.
(Continued)

*Primary Examiner* — Quang N Vo
(74) *Attorney, Agent, or Firm* — Staas & Halsey LLP

(57) ABSTRACT

An image forming apparatus is provided. The image forming apparatus may include an image forming unit to print data, a body portion disposed in the image forming unit, a display unit disposed on the body portion to be spaced apart from the body portion at a predetermined interval, and a scan unit disposed below the display unit, and a scan space is formed between the image forming unit and the display unit.

20 Claims, 23 Drawing Sheets

(52) U.S. Cl.
CPC ..... *H04N 1/00551* (2013.01); *H04N 1/00557* (2013.01); *H04N 1/00564* (2013.01)

(58) Field of Classification Search
USPC ........ 358/452, 1.15, 1.9, 450, 453, 538, 448
See application file for complete search history.

(56) References Cited

U.S. PATENT DOCUMENTS

| 8,134,759 | B2 | 3/2012 | Albahri | |
|---|---|---|---|---|
| 2002/0131648 | A1* | 9/2002 | Hayashide | G06T 5/50 |
| | | | | 382/275 |
| 2004/0120008 | A1* | 6/2004 | Morgan | G07F 17/26 |
| | | | | 358/1.18 |
| 2005/0071167 | A1 | 3/2005 | Levin et al. | |
| 2005/0137942 | A1* | 6/2005 | LaFleur | G07G 1/0018 |
| | | | | 705/26.1 |
| 2007/0005447 | A1* | 1/2007 | Christ, Jr. | G06Q 10/087 |
| | | | | 705/26.1 |
| 2007/0008591 | A1 | 1/2007 | Asaoka | |
| 2007/0076268 | A1 | 4/2007 | Shojo et al. | |
| 2009/0027744 | A1 | 1/2009 | Kim | |
| 2009/0284787 | A1* | 11/2009 | Imai | H04N 1/00408 |
| | | | | 358/1.15 |
| 2011/0024976 | A1* | 2/2011 | Imae | B65H 5/062 |
| | | | | 271/227 |
| 2011/0043458 | A1 | 2/2011 | Kumor | |
| 2011/0051203 | A1* | 3/2011 | Fiul | G06F 1/1616 |
| | | | | 358/475 |
| 2011/0145073 | A1* | 6/2011 | Richman | G06Q 30/02 |
| | | | | 705/14.66 |
| 2014/0267533 | A1* | 9/2014 | Alhashem | B41J 2/473 |
| | | | | 347/211 |

OTHER PUBLICATIONS

European Report dated Jun. 2, 2017 from European Patent Application No. 15171674.3, 6 pages.

* cited by examiner

IMAGE FORMING APPARATUS AND METHOD FOR CONTROLLING THE SAME

CROSS-REFERENCE TO RELATED APPLICATIONS

This application claims the priority benefit from Korean Patent Application No. 10-2015-0043228, filed on Mar. 27, 2015, in the Korean Intellectual Property Office, and U.S. Provisional Application No. 62/011,248, filed on Jun. 12, 2014, in the USPTO, the disclosures of which are incorporated herein by reference in their entirety.

BACKGROUND

1. Field

Embodiments relate to an image forming apparatus and a method for controlling the same, and more particularly, to an image forming apparatus and a method for controlling the same, for providing various services using a large size display unit disposed on the image forming apparatus.

2. Description of the Related Art

By virtue of the development of electronic technologies, various types of electronic products have been developed. In particular, as computers have been spread and become popular, a penetration rate of computer peripherals has also been enhanced day by day. Computer peripherals refer to devices for enhancing utilization of computers. Representative examples of computer peripherals may include an image forming apparatus such as a printer, a scanner, a copier, a multi-function peripheral (MFP), etc.

In general, an image forming apparatus refers to an apparatus for printing print data generated by a terminal apparatus such as a computer on a recording sheet. Examples of the image forming apparatus may include a copier, a printer, a facsimile, or a multi-function peripheral (MFP) that multiply implements functions thereof through one device.

An image forming apparatus includes a display and a manipulation input unit, for receiving a user's operation command. In this regard, it is general to dispose the display and the manipulation input unit on a front surface of the image forming apparatus. In detail, a scan unit having a structure for instrumentally closing and opening a printing paper is disposed on the image forming apparatus, and thus a display unit is inevitably disposed on the front surface of the image forming apparatus, conventionally.

In addition, the display unit occupies an area corresponding to the size of the display unit in that the display unit is disposed in a horizontal state or is inclined, and thus a small size display is disposed in the image forming apparatus.

However, when a small size display unit is used, it is difficult to check content of a file on which a printing operation is currently performed, from the image forming apparatus or it is difficult to edit the content of the file.

SUMMARY

Exemplary embodiments overcome the above disadvantages and other disadvantages not described above. Also, embodiments are not required to overcome the disadvantages described above, and an exemplary embodiment of may not overcome any of the problems described above.

One or more embodiments provide an image forming apparatus and a method for controlling the same, for providing various services using a large size display unit disposed on the image forming apparatus.

According to an aspect of one or more embodiments, there is provided an image forming apparatus which includes a body portion, an image forming unit disposed in the body portion to print data, a display unit disposed above the body portion so as to be spaced apart from the body portion at a predetermined interval, and a scan unit disposed below the display unit, wherein a scan space is formed between the body portion and the display unit, and wherein the display unit displays a document captured by the scan unit.

The display unit may display the document captured by the scan unit in real time.

The image forming apparatus may further include a controller to control storage in a storage unit of the document captured by the scan unit in response to a scan command being input to the image forming apparatus.

The scan space may have a height of 100 mm to 200 mm.

The body portion may include a container to store paper.

The body portion may include a discharger disposed on a left or right surface of the body portion, and wherein the discharger discharges a printout.

The image forming apparatus may further include a second scan unit disposed in the body portion, wherein the second scan unit may automatically feed a document placed in a document loader disposed on a left or right surface of the body portion and scans the document.

The scan unit may further include a wide angle lens and scans the document through a wide angle lens.

The scan unit may further include an image processor which compensates for distortion of the scanned scan image.

The display unit may be disposed such that an upper surface of the display unit is inclined to one side based on a paper sheet.

The display unit may be rotatably connected to the body portion.

An image display region of the display unit may be greater than A3 paper.

The display unit may display the scanned image including displaying an actual size of the document.

The image forming apparatus may further include a manipulation input unit configured to receive selection of a file stored in at least one of a storage unit in the image forming apparatus, a server, and a terminal apparatus, wherein the display unit displays a document image corresponding to the selected file.

The manipulation input unit may receive an edit command for a document image displayed on the display unit, and an image processor which edits the document image according to the received edit command.

The image forming apparatus may further include a communication interface unit configured to receive additional information corresponding to the selected file from at least one of the storage unit, the server, and the terminal apparatus, wherein the display unit may display the received additional information together with the document image.

The display unit may display at least one of a function control menu for performing a function of the image forming apparatus, and pre-registered known information.

The image forming apparatus may further include a communication interface unit configured to receive data from a terminal apparatus, and a controller to control the image forming unit to print the received data while performing a scan operation of the scan unit or a display operation of the display unit.

According to an aspect of one or more embodiments, there is provided a method for controlling an image forming apparatus which includes a body portion, a display unit disposed above the body portion and spaced apart from the body portion at a predetermined interval, and a scan unit disposed below the display unit, the method including scanning a document positioned between the body portion and the display unit to generate a scanned image of the document, displaying the scanned image including displaying an actual size of the scanned document, and storing the scanned image in response to a scan command being input.

The method may further include compensating for distortion of the scanned image.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
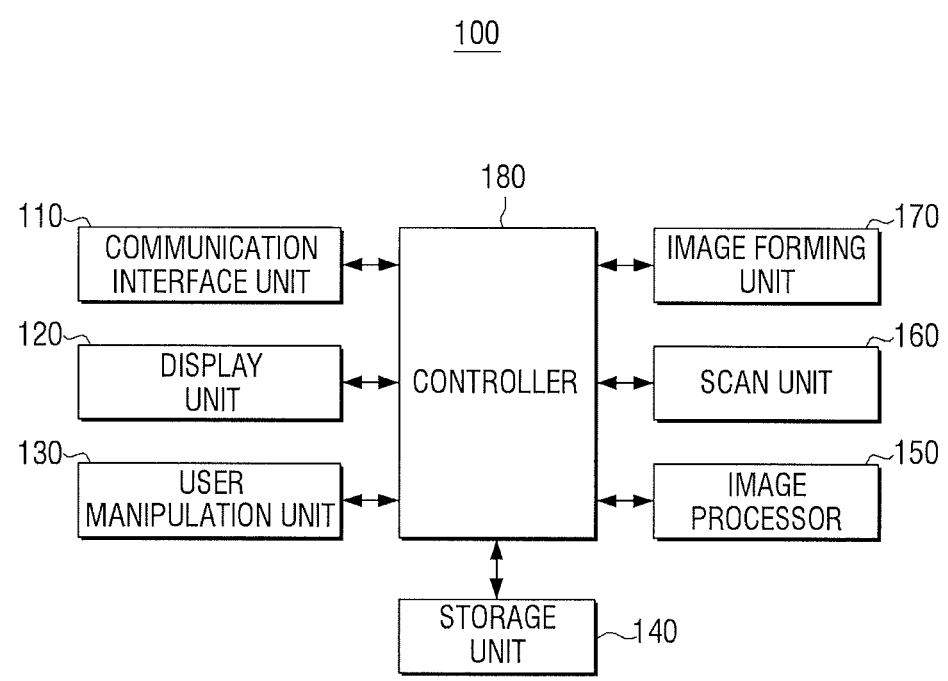
FIG. 1 is a block diagram illustrating a structure of an image forming apparatus according to an embodiment.

Reference will now be made in detail to embodiments, examples of which are illustrated in the accompanying drawings, wherein like reference numerals refer to the like elements throughout.

FIG. 1 is a block diagram illustrating a structure of an image forming apparatus 100 according to an embodiment.

Referring to FIG. 1, the image forming apparatus 100 includes a communication interface unit (communication interface) 110, a display unit (display)120, a manipulation unit 130, a storage unit 140, an image processor 150, a scan unit (scanner)160, an image forming unit 170, and a controller 180. The image forming apparatus 100 may be a facsimile, a multi-function function peripheral (MFP), and so on, for performing printing, copy, a facsimile transmission function, and so on. Accordingly, the image forming apparatus according to an embodiment may also be referred to an image scanning apparatus.

The communication interface unit 110 may be connected to a terminal apparatus (not shown) such as a mobile device (e.g., a smart phone, a tablet PC, etc.), a PC, a notebook PC, a personal digital assistant (PDA), a digital camera, and so on and may receive a file and print data from the terminal apparatus (not shown). In detail, the communication interface unit 110 is formed to connect the image forming apparatus 100 to an external apparatus. In this regard, it may be possible to connect the image forming apparatus 100 to a terminal apparatus through a local area network (LAN) and the Internet and to also connect the image forming apparatus 100 to the terminal apparatus through a universal serial bus (USB) port or a wireless communication (e.g., WiFi 802.11a/b/g/n, NFC, and Bluetooth) port.

In addition, the communication interface unit 110 may transmit scan data scanned by the image forming apparatus 100 to a terminal apparatus or a server. In addition, the communication interface unit 110 may receive a scan command from a terminal apparatus (not shown).

In addition, the communication interface unit 110 may receive a file stored in a PC, a notebook PC, and so on, and information associated with the corresponding file or receive file or information corresponding to user selection through another terminal apparatus, a server, and so on.

The display unit 120 displays various information items provided by the image forming apparatus 100. In detail, the display unit 120 may display a user interface window for selection of various functions provided by the image forming apparatus 100. The display unit 120 may be a monitor such as a liquid crystal display (LCD) or the like, and embodied as a touchscreen for simultaneously performing functions of the manipulation unit 130 that will be described later.

The display unit 120 may be disposed above a body portion 101 so as to be spaced apart from the body portion 101 at a predetermined interval and may have a sufficient size so as to display an A3 printing paper (297 mm×420 mm) with an actual size.

In addition, the display unit 120 may be disposed in such a manner that an upper surface thereof is inclined to one side based on a printing paper, or may be rotatably connected to the body portion 101 so as to be or not to be inclined according to user manipulation, which will be described below with reference to FIGS. 10, 11A, and 11B.

A detailed arrangement of the display unit 120 will be described below with reference to FIG. 2. According to an embodiment, the display unit 120 may have a greater size than an A3 print sheet. However, in some embodiments, the display unit 120 may have a different similar size to A3, and also have a size for displaying an A4 (or letter) printing paper with an actual size, for a large size device.

The display unit 120 may display a function control menu for performing a function of the image forming apparatus. In addition, the display unit 120 may display pre-registered information together with the aforementioned menu. Here, the pre-registered information may include announced information or announced information inside a company, advertisement, and so on, which are associated with the corresponding image forming apparatus. That is, the image forming apparatus 100 according to an embodiment includes a large size of display unit, and thus may display a general menu for controlling a function of an image forming apparatus and simultaneously provide various additional information items to a user. For example, when the image forming apparatus according to an embodiment is positioned in a public place such as a library or the like, the image forming apparatus may additionally perform an advertisement displaying function and a Kiosk function as well as functions of a general image forming apparatus, such as printing, copy, and so on.

In addition, the display unit 120 may display a document image captured by the scan unit 160 in real time. In detail, in response to a scan function being selected by a user, the scan unit 160 may scan (e.g., photograph) a document in a scan space and the display unit 120 may display the scanned image in real time.

Likewise, the display unit 120 according to an embodiment may display the document image in real time such that a user may easily predict the scan result. That is, since a conventional flatbed scanner scans a document in a reversed state, the document needs to be manipulated in an opposite direction from the scan image result, and thus a scan operation is difficult. In addition, conventionally, the user is capable of checking the result after the scan image is generated, and thus when the inappropriate result is obtained, re-operation is needed. However, the image forming apparatus according to an embodiment may display a document image in real time, and thus the user is capable of easily predicting the scan result.

In addition, the display unit 120 may display the document image with an actual size of the scanned document image. Likewise, a display apparatus according to an embodiment may display the document image with an actual size, and thus the user is capable of easily predicting the output result and the scan result. In some embodiments, it is obvious to simultaneously display the document image so as to be enlarged or reduced according to user selection manipulation while displaying the document image with an actual size.

In addition, the display unit 120 may display a file list stored in the storage unit 140 of the image forming apparatus, another terminal apparatus, and a server. In addition, the display unit 120 may display a document image corresponding to the file selected by the user. In this case, the display unit 120 may display the document image with a size corresponding to an output image of the corresponding document.

In addition, when the user performs an edit process on the document image displayed on the display unit 120, the image processor 150 that will be described below may perform an edit operation corresponding to a user edit command. The display unit 120 may display the result according to the edit operation. In this case, the display unit 120 may also display a virtual keyboard required to edit the document together with the document. Since the display unit 120 according to an embodiment has a large size screen, the virtual keyboard may also be displayed with an actual keyboard size so as to correspond to the large size screen such that the user is capable of easily correcting the document.

The manipulation unit 130 may receive function selection and a control command about the corresponding function from the user. Here, the function may include a printing function, a copy function, a scan function, a facsimile transmission function, a reading function of a file stored in the storage unit 140 (a terminal apparatus or a server), an edit function of a specific file, an advertisement reproduction function, and so on.

The manipulation unit 130 may receive a function control menu displayed on the display unit 120. In detail, the manipulation unit 130 includes a plurality of function keys that allow the user to set or select various functions supported by the image forming apparatus 100. The manipulation unit 130 may be embodied as a plurality of buttons, a keyboard, a mouse, and so on, or may be embodied as a touchscreen for simultaneously performing the aforementioned functions of the display unit 120. When a physical keyboard is disposed in the image forming apparatus 100, the keyboard may be disposed on the image forming apparatus in which the display unit 120 is disposed.

The aforementioned scan command may be a command for performing only a scan operation or may be a command such as scan-to-server for transmitting a scan result to a specific server, scan-to-DLNA, scan-to-cloud, scan-to-email, and so on. According to an embodiment, although the case in which the scan command is received through the manipulation unit 130 has been described, the scan command may be received from a terminal apparatus (not shown) through the communication interface unit 110, in some embodiments.

In addition, the manipulation unit 130 may receive selection of a file stored in one of a storage unit in an image forming apparatus, a server, and a terminal apparatus. The manipulation unit 130 may perform function control (e.g., printing, delete, copy, move, etc.) or an edit command for the selected file.

The storage unit 140 may store scan data generated by the scan unit 160. In addition, the storage unit 140 may store pre-registered information. In addition, the storage unit 140 may store information received from a terminal apparatus or a server as well as print data received from the terminal apparatus.

The storage unit 140 may be embodied as a storage medium inside the image forming apparatus 100 and an external storage medium, for example, a removable disk including a USB memory, a storage medium connected to a host, a web server through a network, and so on.

The image forming unit 170 may print printing data. In detail, the image forming unit 170 may parse and render a file that is pre-stored in the storage unit 140 or printing data received from the terminal apparatus and print the file or the printing data on a printing paper.

The image forming unit 170 may be disposed in the body portion 101 and may include a loader for loading printing papers therein.

The scan unit 160 scans a document. In detail, the scan unit 160 may include a plurality of scan devices. A first scan device scans a document positioned in a scan space between a body portion and a display unit via a scanning (e.g. photography) method. A second scan device automatically scans a plurality of documents using an automatic document feeder.

The first scan device may be disposed below the display unit, and the second scan device may be disposed on the image forming unit 170 of the body portion 101. Arrangement and operations of the first scan device will be described below with reference to FIG. 2. In addition, arrangement and operations of the second scan device will be described below with reference to FIGS. 9A, 9B, and 10.

The image processor 150 may edit a scan image generated by the scan unit 160. In detail, the image processor 150 may compensate for distortion generated during a scan process. For example, when the first scan device scans a document through a wide angle lens, a scan image generated using the wide angle lens may be distorted. In this case, the image processor 150 may compensate for distortion generated using the wide angle lens using an already known technology.

In addition, the image processor 150 may compensate for a hand image on the scan image. In detail, when the user performs a scan operation in a scan space, the document and a hand may be photographed together. Accordingly, the image processor 150 may detect whether a hand or a finger is present in the scan image, and upon detecting the hand or the finger, the image processor 150 may perform correction for removing the corresponding portion.

In addition, when a user notebook or book is scanned, the image processor 150 may compensate for distortion such as bending of the document and shadow between pages and divide both documents into single-pages. In this case, the user may adjust the brightness of a document via brightness adjustment when the document is dark and perform editing for emphasis of desired color and page editing for outputting one sheet of document as various sheets of documents. This function may be supported by the image processor 150.

In addition, the image processor 150 may edit a currently displayed document image in response to a user edit command in the manipulation unit 130. The image processor 150 may store the edited image in the storage unit 140.

The controller 180 controls each component inside the image forming apparatus 100. In detail, upon receiving selection of a scan function from the user, the controller 180 may control the scan unit 160 to scan (or photograph) a document in real time and control a scan image scanned by the scan unit 160 on the display unit 120.

In addition, the controller 180 may scan a document and store the scanned document image in the storage unit 140, in response to a user scan command. In this case, the controller 180 may control the image processor 150 to compensate for distortion of the scanned scan image and to store the scan image with corrected distortion or transmit the scan image to a terminal apparatus.

The controller 180 may separately (independently) perform a scan function and a printing function. For example, while the user selects a scan function and performs a scan operation, a printing operation may also be performed on printing data received from a terminal apparatus of another user.

As described above, the image forming apparatus 100 according to an embodiment includes a large size display unit disposed therein, and thus the user may receive additional auxiliary information in addition to general function information as well as may easily check a document and a scan image.

In addition, since the image forming apparatus 100 according to an embodiment may display a document positioned in a scan space on a display unit in real time, a shape of the generated scan image may be easily predicted, and since the scan image is displayed to correspond to the actual size of the document, the user may easily recognize and edit content.

In addition, since the image forming apparatus 100 according to an embodiment performs a scan operation using a camera method, it is possible to enlarge and scan a specific portion of the document, and it is possible to edit the scanned document in real time and to edit and output the scanned document according to user use. The image forming apparatus 100 may transmit the scanned and edited document to a mobile device and store the document in a server.

Figure 2:
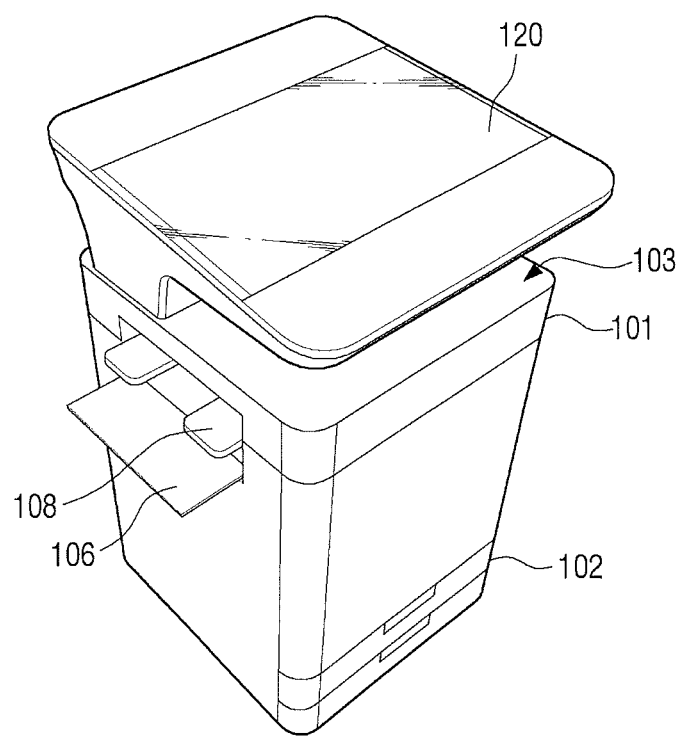
FIG. 2 is a schematic diagram illustrating a structure of an image forming apparatus according to an embodiment.
Figure 3:
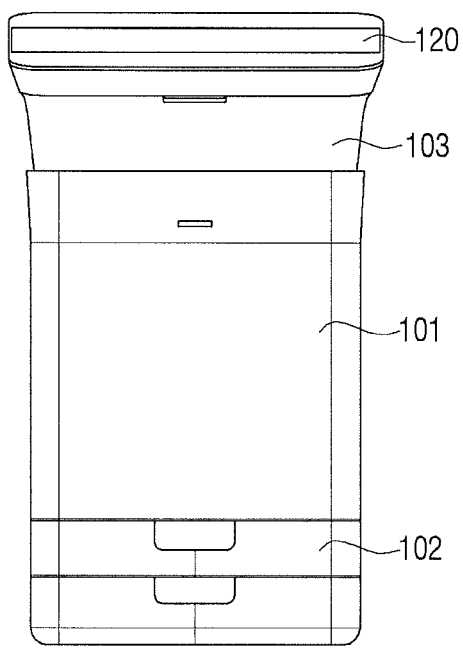
FIG. 3 is a diagram of the image forming apparatus illustrated in FIG. 2 and viewed from the front.
Figure 4:
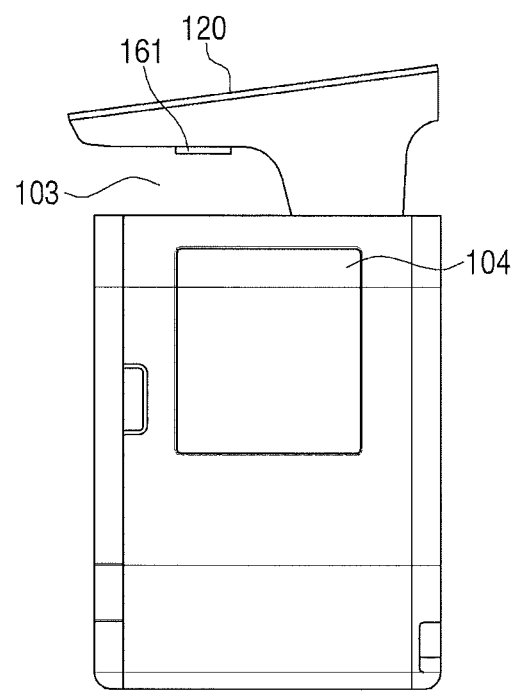
FIG. 4 is a diagram of the image forming apparatus illustrated in FIG. 2 and viewed from the left.
Figure 5:
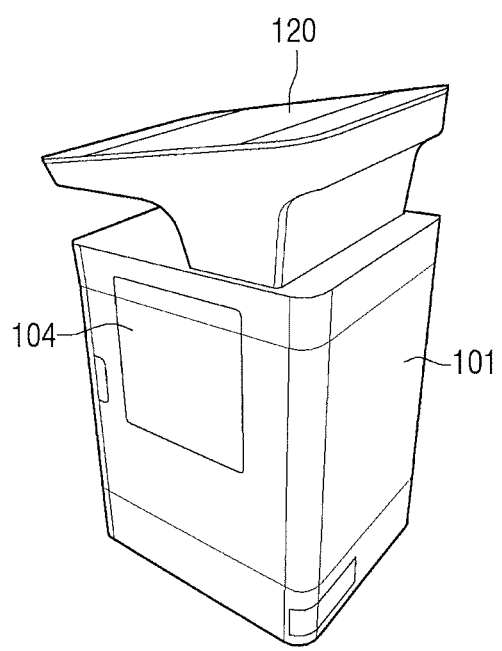
FIG. 5 is a diagram of the image forming apparatus illustrated in FIG. 2 and viewed from the right.
Figure 6:
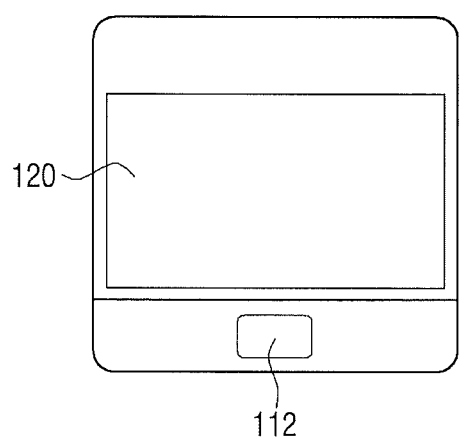
FIG. 6 is a diagram of the image forming apparatus illustrated in FIG. 2 and viewed from the above.

FIG. 2 is a schematic diagram illustrating a structure of the image forming apparatus 100 according to an embodiment. FIG. 3 is a diagram of the image forming apparatus 100 illustrated in FIG. 2 and viewed from the front. FIG. 4 is a diagram of the image forming apparatus 100 illustrated in FIG. 2 and viewed from the left. FIG. 5 is a diagram of the image forming apparatus 100 illustrated in FIG. 2 and viewed from the right. In addition, FIG. 6 is a diagram of the image forming apparatus 100 illustrated in FIG. 2 and viewed from the above.

Referring to FIGS. 2 to 6, the image forming apparatus 100 is configured in such a way that the body portion 101 is disposed in a lower part. In addition, the display unit 120 is disposed above the body portion 101 so as to be spaced apart from the body portion 101 by a predetermined interval.

As illustrated, the display unit 120 may be disposed in such a manner that an upper surface thereof is inclined to one side based on a printing paper such that a viewer is capable of easily viewing an image displayed on the display unit 120. That is, the display unit 120 may be disposed to be inclined downward in a front direction. Inclination of the display unit 120 may be adjusted by a user, which will be described below with reference to FIGS. 10, 11A, and 11B.

Accordingly, a scan space in which a document is positioned and scanned between the body portion 101 and the display unit 120 is formed. Such a scan space 103 will be described below with reference to FIGS. 7A and 7B. The scan space may be disposed with a height at which the user easily performs manipulation with hands. That is, the scan space may be at a waist of a general adult.

In order to scan a document positioned on the aforementioned scan space, a scan device of the first scan device, for example, an imaging device such as a CCD and a CMOS may be disposed below the display unit 120, that is, on the scan space. In addition, in order to photograph a wide area of a low scan space, a wide angle lens may be used as a lens for concentrating light of the imaging device.

In the body portion 101, the image forming unit 170, a container 102, a second scan unit (not shown), a document loader 105, a document discharger 106, a printout discharger 104, and so on are disposed.

In addition, the container 102 for storing a printing paper may be disposed below the body portion 101, that is, below the image forming unit 170. Although two loaders are disposed in the illustrated example, only one loader may be disposed or three or more loaders may be disposed, in some embodiments.

A printing sheet positioned in the container 102 may be automatically fed to the image forming unit 170, and a printout obtained via printing of printing data may be discharged through the printout discharger 104 disposed on a right surface of the body portion 101. In some embodiments, the printed printout may be disposed on a left surface of the body portion 101, which will be described with reference to FIG. 8B.

The document loader 105 for scanning a plurality of printing documents may be disposed on the left of the body portion 101.

Documents positioned in the document loader 105 may be input to a second scan unit by an automatic document feeder, a scan operation may be automatically performed on the documents, and the scanned documents may be discharged through the document discharger 106 disposed on the left of the body portion 101. A detailed operation of the second scan unit will be described below with reference to FIGS. 9A and 9B.

An NFC communication module for local area communication may be disposed on an upper region in which the display unit 120 is disposed. The NFC communication module may be a device for acquisition of information through a user personal identification tag and may be used to authenticate a user. In some embodiments, a physical keyboard may be disposed together with the NFC communication module, as illustrated in FIG. 11A.

Figure 7A:
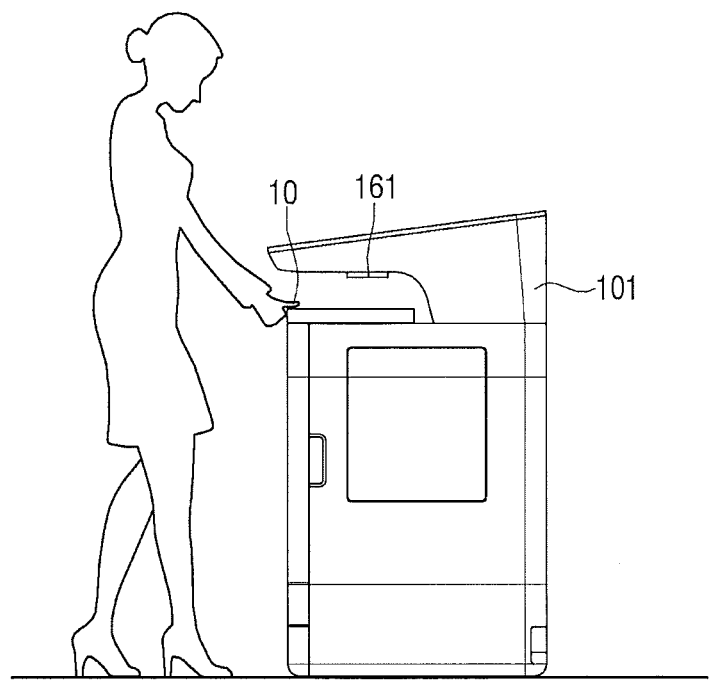
FIGS. 7A and 7B are diagrams for explanation of a scan space of the image forming apparatus illustrated in FIG. 2.
Figure 7B:
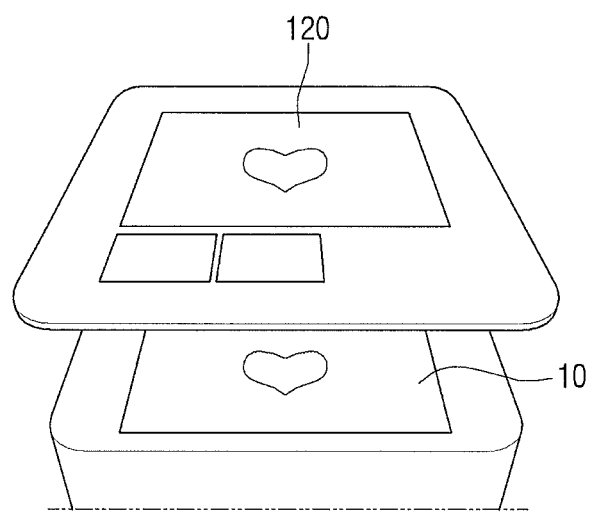

FIGS. 7A and 7B are diagrams for explanation of the scan space 103 of the image forming apparatus 100 illustrated in FIG. 2.

Referring to FIG. 7A, an imaging device 161 may be disposed on the scan space 103, that is, below the display unit 120 and may scan a document 10 positioned below the scan space 103 via a camera photograph method. That is, conventionally, predetermined regions of a document are sequentially photographed and scanned, but according to the current embodiment, an entire region of a document is simultaneously photographed and scanned.

When a scan space is disposed with a higher height, a disposed position of the display unit 120 is enhanced, and thus it is difficult to check an image displayed on the display unit 120 by the user. Accordingly, according to an embodiment, a scan space is designed to be disposed with a height of 100 mm to 200 mm, and a wide angle lens is used to sufficiently scan a document in a low scan depth. Although not illustrated, a lighting component for providing a sufficient amount of light to scan the document may be disposed on the aforementioned scan space 103.

Thus far, although the case in which the height of the scan space is fixed has been illustrated and described, a disposed height of a display unit may be adjusted in some embodiments. In addition, a disposed angle of the display unit may also be adjusted by the user, which will be described below with reference to FIGS. 10, 11A, and 11B.

Referring to FIG. 7B, the document 10 is put in the scan space 103. In this case, in response to a scan function being selected by the user, the document may be photographed and displayed on the display unit 120 in real time.

Accordingly, the user may easily check the scan result, and thus it is not necessary to repeatedly input a scan command for a scan operation desired by the user. In addition, the user may check both the document and the captured document image at a single glance, thereby enhancing fabricated convenience of a document for a scan operation.

That is, since a conventional flatbed scanner scans a document in a reversed state, the document needs to be moved to an opposite direction to a scan image in order to dispose the document for arrangement desired by the user. In addition, the user is inconvenienced in that arrangement of the document is capable of being checked only after the scan operation is completely performed.

However, with regard to the display unit according to an embodiment, an arranged direction of the document and a displayed direction of an image of the display unit are the same, and the document may be accurately moved according to a viewed position of a document image displayed on the display unit. In addition, the user is capable of recognizing current arrangement of the document in real time, and thus it is not necessary to repeatedly perform a scan process for desired arrangement.

Figure 8A:
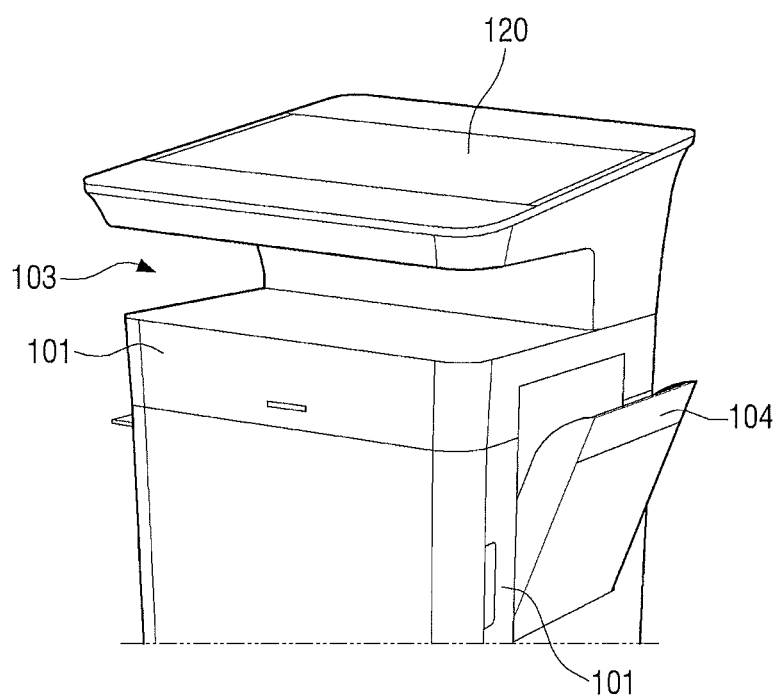
FIGS. 8A and 8B are diagrams for explanation of a structure of a printout discharger.
Figure 8B:
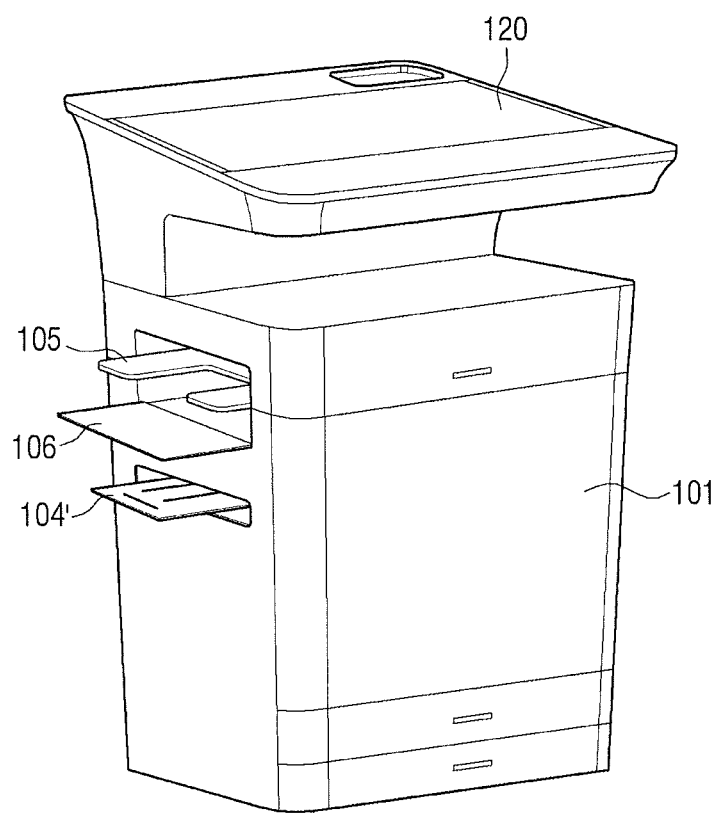

FIGS. 8A and 8B are diagrams for explanation of a structure of the printout discharger 104.

Referring to FIGS. 4 and 8A, the printout discharger 104 for discharging a printout is disposed on the right of the body portion 101. As illustrated in FIGS. 8A and 8B, the printout discharger 104 may variably protrude to a right side of the body portion 101. For example, when there is no printout, the printout discharger 104 may be positioned inside the body portion 101, and when the user performs a printing process, the printout discharger 104 may protrude outwards. The protrusion may be performed according to user manipulation or may be automated.

Thus far, the case in which the printout discharger 104 is disposed in the right of the body portion 101 and variably protrudes has been illustrated, the printout discharger 104' may protrude to a left side of the body portion 101 in some embodiments, as illustrated in FIG. 8B.

Figure 9A:
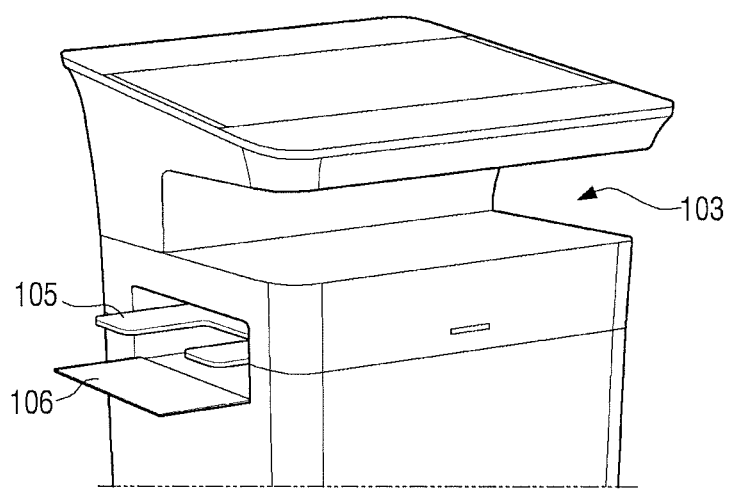
FIGS. 9A and 9B are diagrams for explanation of a second scan unit.
Figure 9B:
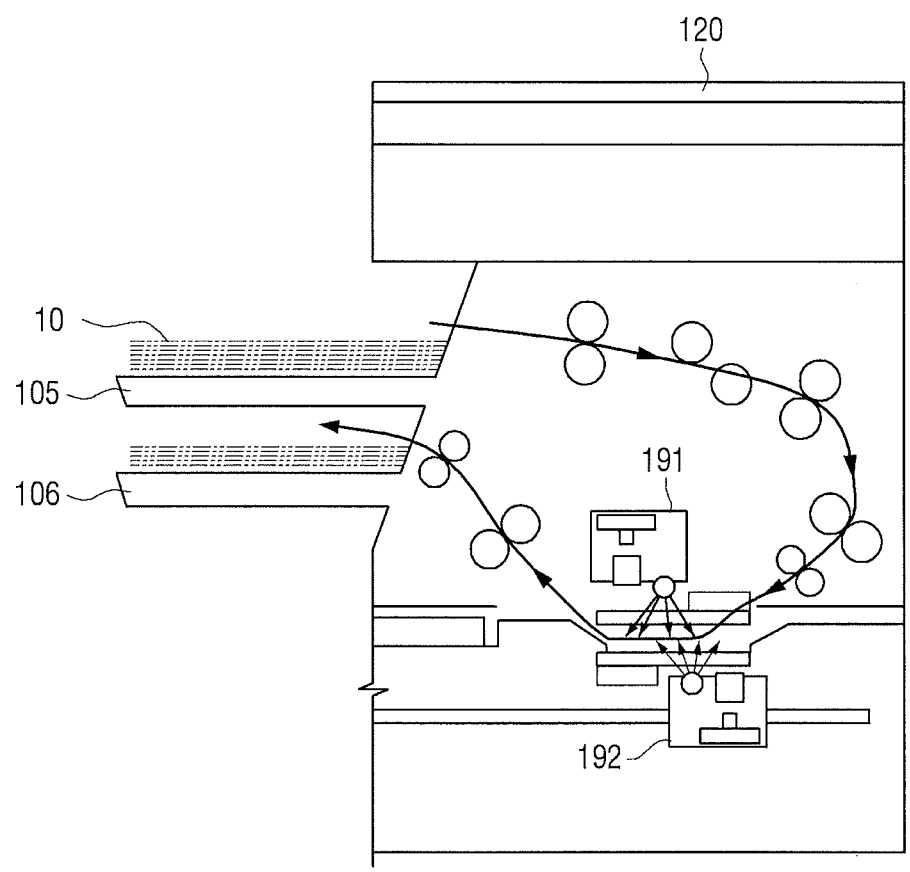

FIGS. 9A and 9B are diagrams for explanation of a second scan unit.

Referring to FIG. 9A, the second scan device is disposed in the body portion 101 and disposed on the image forming unit 170 in the body portion 101. In addition, the second scan device may automatically feed and scan a document in the document loader 105 disposed at a left side of the body portion 101. In addition, the scanned document may be discharged through the document discharger 106 disposed at a left side of the body portion 101. In this case, the second scan device may be a single-sided scan device for scanning only a single surface of the document or a double-side scan device for scanning both surfaces of the document.

The scan unit may be designed with a structure for easily removing a paper sheet without damage of the document in the case of paper jam. In addition, the image forming apparatus 100 may provide a method for removing a paper sheet in the case of paper jam in the form of user manual or moving picture (e.g., animation).

Thus far, although the case in which the document to be scanned is positioned in a left side and the scanned document is discharged from a left side of the body portion 101 has been described, the document may be input and discharged at a right side or the document may be input at a left side and discharged at a right side, in some embodiments.

Referring to FIG. 9B, a scan path along which the document is moved is disposed between the document loader 105 and the document discharger 106. Accordingly, documents positioned in the document loader 105 may be moved to the scan path on a sheet-by-sheet basis and moved between a plurality of scan units through a plurality of rollers.

In response to the document being transmitted through the plurality of scan units, a first scan unit 191 of the second scan device may scan a first surface of the document 10, and a second scan unit 192 of the second scan device may scan a second surface of the document 10.

In addition, the document is transmitted through the first scan unit 191 and the second scan unit 192 may be discharged to the document discharger 106 through a plurality of rollers.

Figure 10:
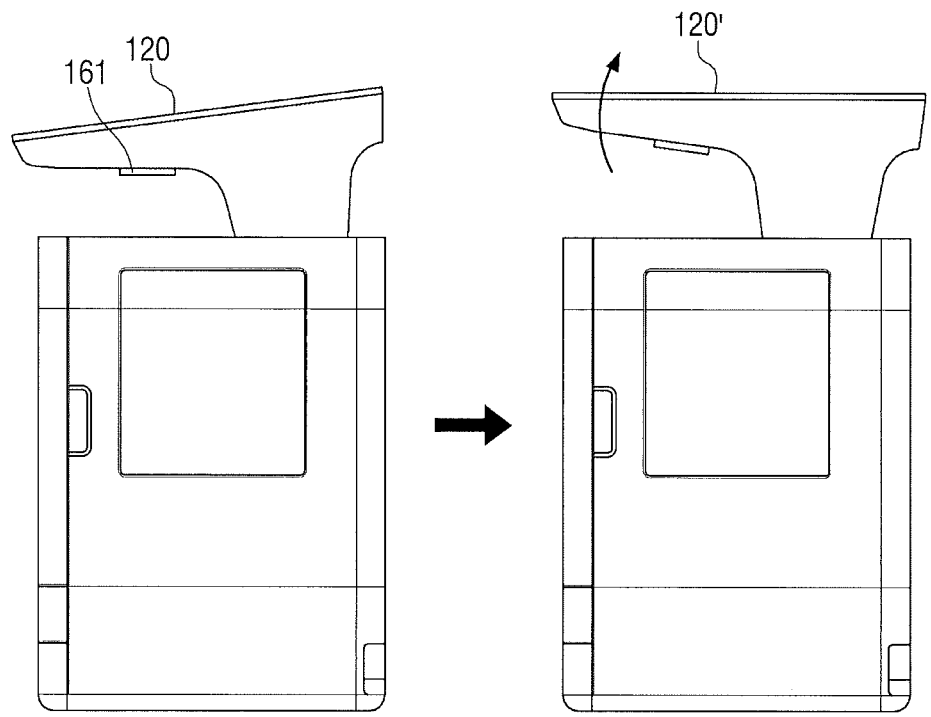
FIG. 10 is a schematic diagram illustrating a structure of an image forming apparatus according to an embodiment.

FIG. 10 is a schematic diagram illustrating a structure of an image forming apparatus according to an embodiment.

Referring to FIG. 10, the display unit 120 may be disposed to be inclined to one side based on a printing paper. In addition, the display unit 120 may be rotatably connected to the body portion 101 such that an upper surface of the display unit 120' is horizontally disposed based on a paper sheet.

FIG. 10 illustrates an embodiment in which the display unit 120 is also rotated as an upper structure of the body portion 101 in which the display unit 120 is disposed is rotated. However, in some embodiments, even if the upper structure is fixed, only the display unit 120 may be rotatably connected, which will be described below with reference to FIGS. 11A and 11B.

Figure 11A:
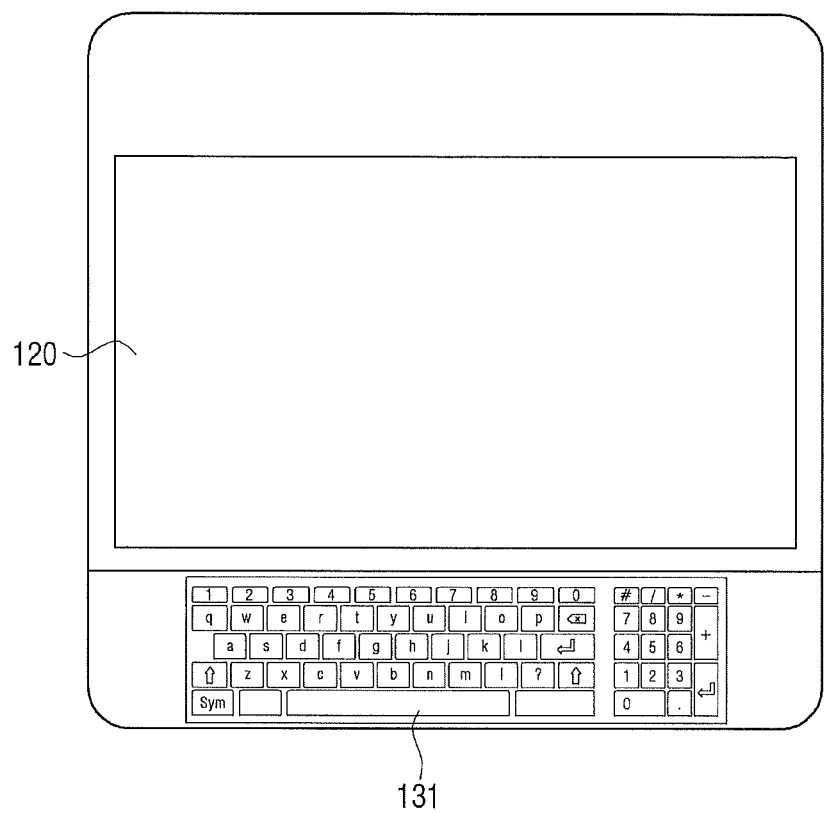
FIGS. 11A and 11B are schematic diagrams illustrating an image forming apparatus according to an embodiment.
Figure 11B:
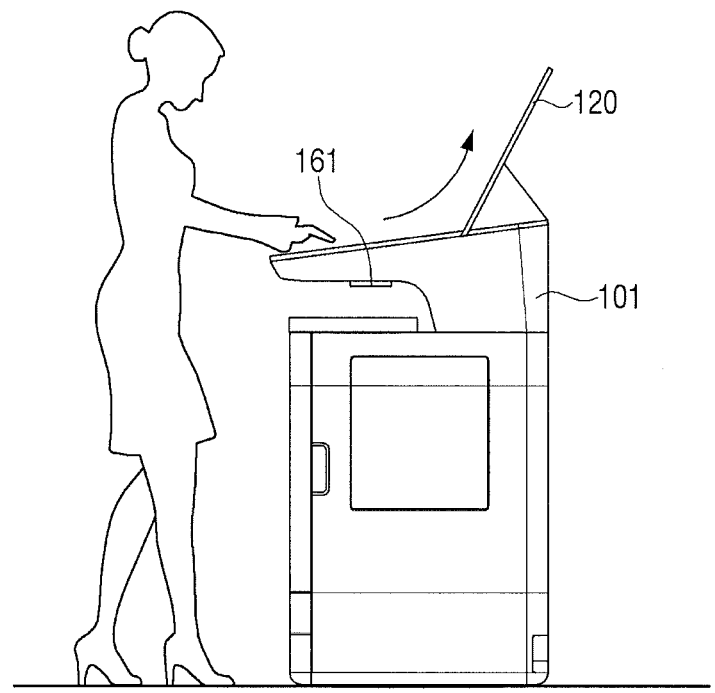

FIGS. 11A and 11B are schematic diagrams illustrating an image forming apparatus 100 according to an embodiment.

Referring to FIG. 11A, the display unit 120 is disposed on the image forming apparatus 100 and a keyboard 131 is disposed in a lower region of the display unit 120. Likewise, since a physical keyboard is disposed on an image forming apparatus, a user may easily perform a document operation on the image forming apparatus.

In this case, since the display unit 120 is horizontally disposed with respect to the keyboard 131, the user may experience inconvenience in a typing operation.

In this case, as illustrated in FIG. 11B, the display unit 120 may slide so as to move the upper surface of the display unit upwards. Accordingly, the user may more easily view a screen of the display unit 120.

Thus far, although the case in which the keyboard is disposed to be also viewed in a space in which the display unit 120 is horizontally disposed has been illustrated, in some embodiments, the keyboard may be disposed on a region (i.e., a region in which the display unit 120 is disposed prior to sliding) that is viewed as the display unit 120 is moved upwards in a sliding manner, as illustrated in FIG. 11B. That is, the keyboard may be disposed so as to be or not to be variably viewed to the user according to a sliding state of the display unit 120.

FIGS. 12 to 18 are diagrams illustrating examples of various user interface windows to be displayed on a display unit illustrated in FIG. 1.

Figure 12:
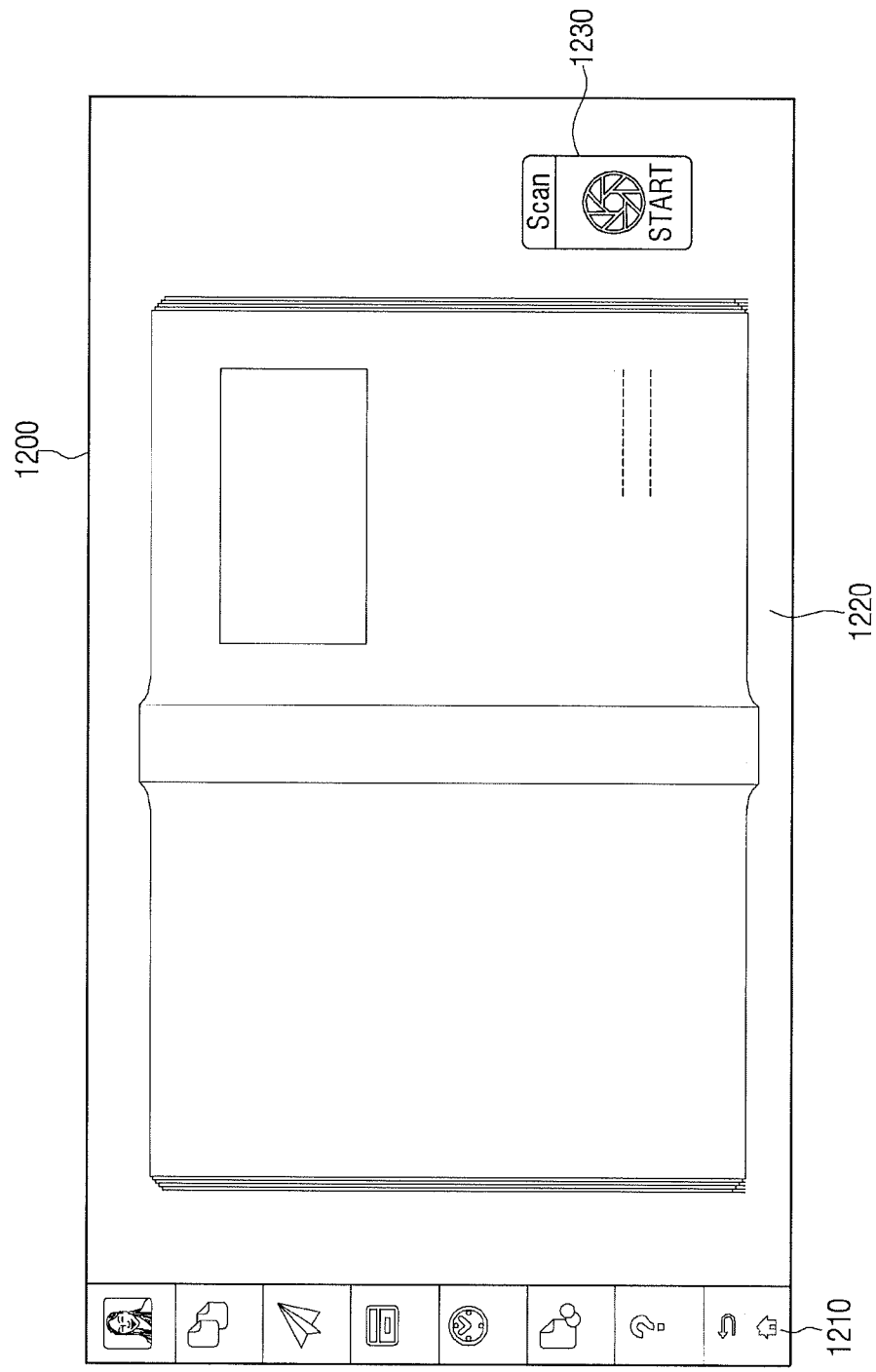
FIGS. 12 to 18 are diagrams illustrating examples of various user interface windows to be displayed on a display unit illustrated in FIG. 1.

FIG. 12 illustrates an example of a user interface window 1200 to be displayed during a scan function.

Referring to FIG. 12, a user interface window 1200 includes a function control menu 1210 for receiving selection of a function of an image forming apparatus, a preview region 1220 for displaying a scan image, and a selection region 1230 for receiving a scan command.

The function control menu 1210 is a region for listing and displaying a plurality of functions supported by the image forming apparatus. In response to any one being selected from displayed function control menus by the user, an image corresponding to the corresponding function may be displayed.

The preview region 1220 may be a region for displaying a scan image scanned by an imaging device and may display a document with an actual size.

Since the document is displayed on the preview region 1220 in real time, the user may easily predict the result of the scan image and perform a scan process. In addition, since the scan image is displayed with the same size as the actual size of the document, the user may easily check content of the document.

In this environment, when the document is appropriately positioned, the user may select the selection region 1230 and perform the scan process. In the illustrated example, although a scan command is received via a gesture of touching a specific region, in some embodiments, the scan command may be received through a physical button disposed at one side of the image forming apparatus. In addition, the image forming apparatus may also receive the scan command via a voice recognition method.

Figure 13:
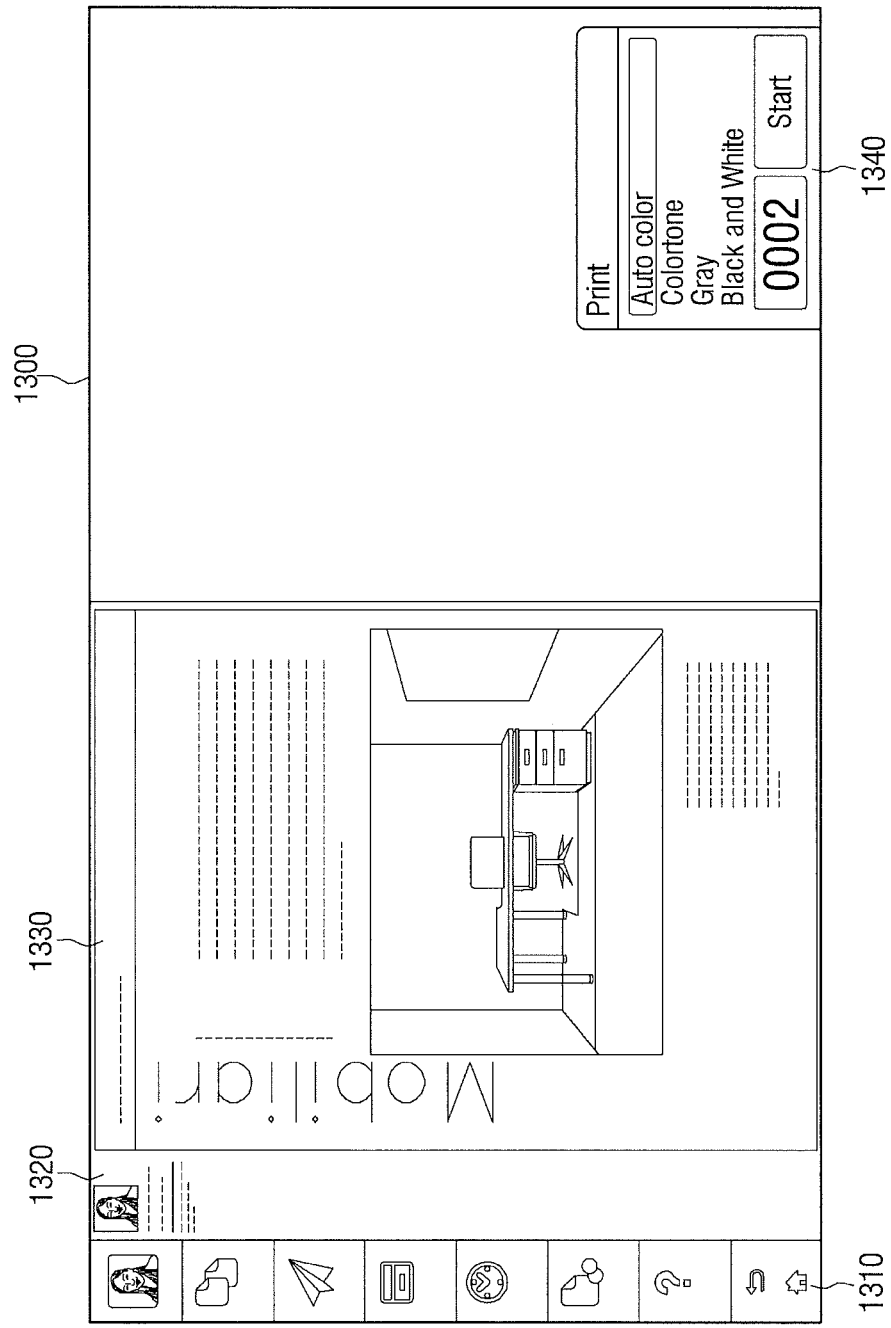

FIG. 13 illustrates an example of a user interface window 1300 to be displayed during a display function.

Referring to FIG. 13, the user interface window 1300 includes a function control menu 1310 for receiving selection of a function of an image forming apparatus, an account display unit 1320 for displaying user account information, a display region 1330 for displaying a document image of a document selected by the user, and a selection region 1340 for receiving a printing command.

The account display unit 1320 may be a region for displaying user account information associated with a function of the image forming apparatus and may display information of the number of printing papers that are capable of being printed by the user.

The display region 1330 is a region for displaying a document image of a file selected by the user. The user may select at least a portion of the document image displayed on the display region 1330 and perform an edit process. In this case, a user interface window like in FIG. 14 may be displayed.

The selection region 1340 is a region for receiving a printing command, that is, a region for receiving the printing command for the currently displayed document from the user.

Figure 14:
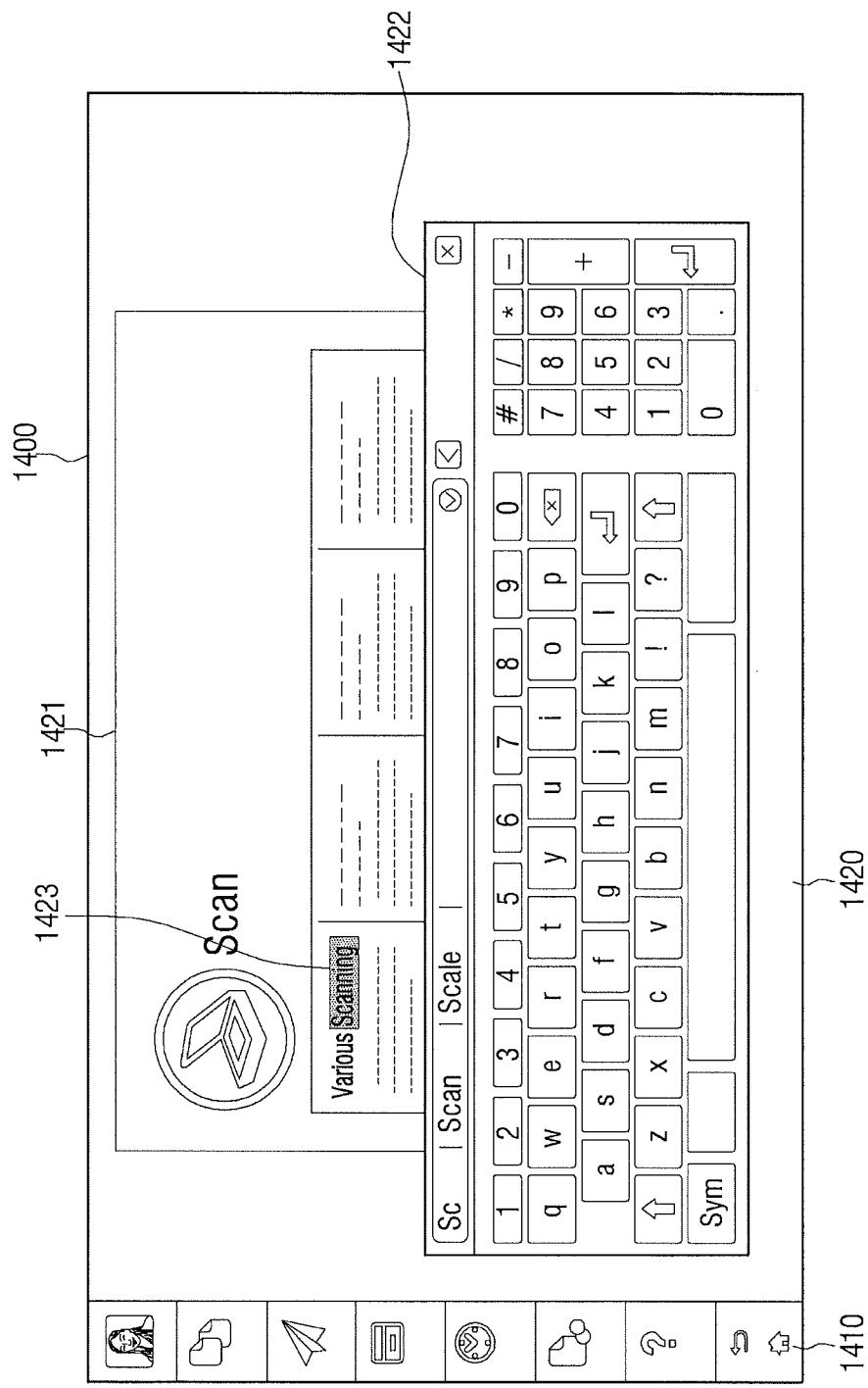

FIG. 14 illustrates an example of a user interface window 1400 to be displayed during an edit function.

Referring to FIG. 14, the user interface window 1400 includes a function control menu 1410 for receiving selection of a function of an image forming apparatus, a region 1421 for displaying a document image of a document selected by the user, a user selection region 1423, and a virtual keyboard region 1422.

The user may select a region to be corrected from the displayed document image (1423) and input words to be written in the selected region using the virtual keyboard region 1422. As such, when the document is corrected, the printing process may be performed on the corrected document, and the corrected document may be transmitted to a terminal apparatus or a server.

Likewise, since the display unit according to an embodiment of has a large size screen, a virtual keyboard with an actual size (or a size corresponding to the size) as well as a document may be displayed. Accordingly, the user may easily correct the document as well as may easily check content of the document. When a physical button like in FIG. 11A is disposed in the image forming apparatus and a user is capable of using the physical button, the virtual keyboard region 1422 illustrated in FIG. 14 may not be displayed.

Figure 15:
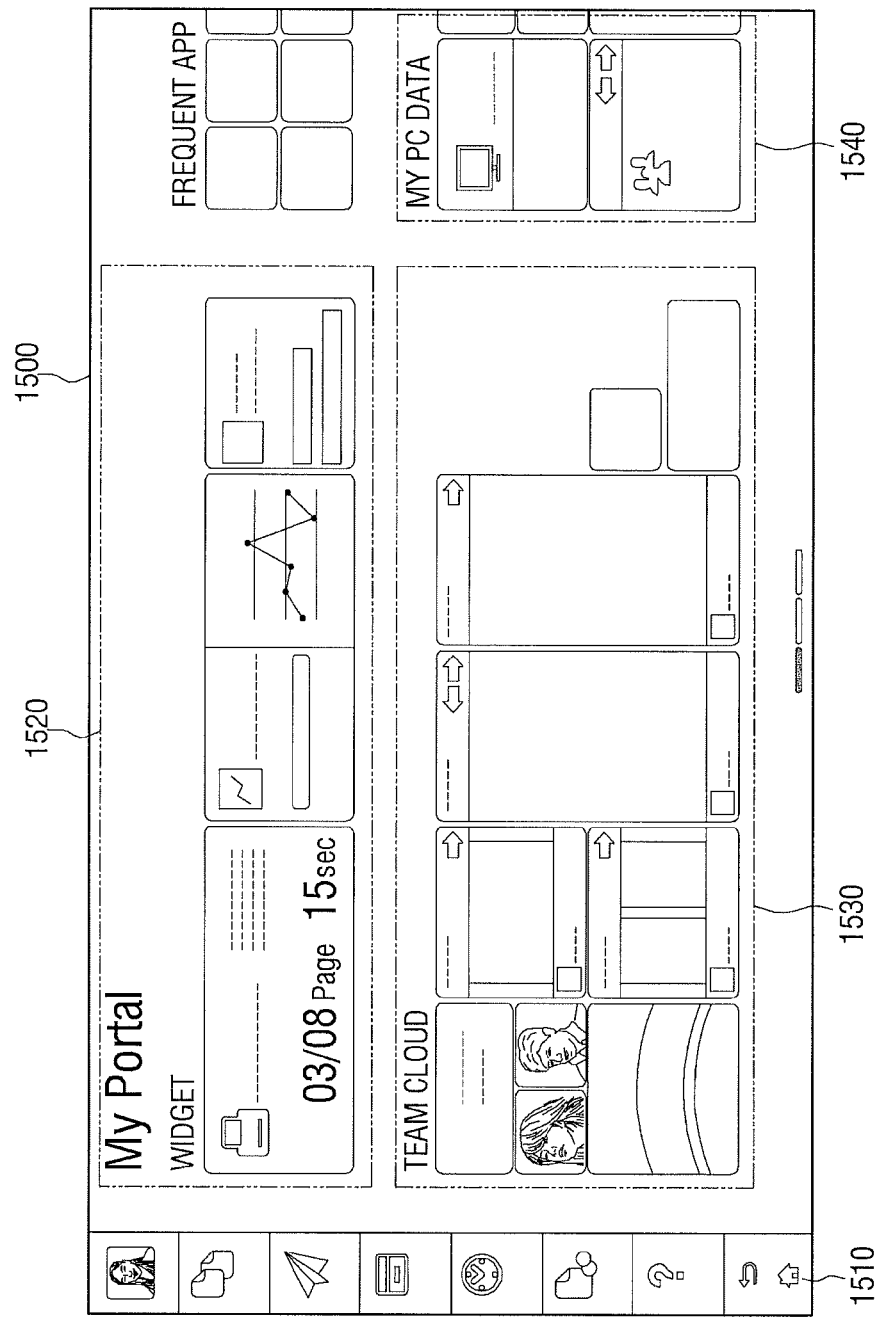

FIG. 15 illustrates an example of a user interface window 1500 to be displayed during a search function.

A general printing process is performed by selecting a file to be printed in a terminal apparatus and inputting a printing command for the corresponding file by a user.

However, conventionally, when a user recognizes that other documents need to be printed after a specific document is printed upon arriving at an image forming apparatus, the user experiences inconvenience of moving to a terminal apparatus, issuing a printing command on other documents, moving back to the image forming apparatus, and then collecting the corresponding printout.

In order to overcome this inconvenience, the image forming apparatus according to an embodiment may directly access and print a file stored in the terminal apparatus and the server. Since the image forming apparatus according to an embodiment includes a large size display unit, a file to be printed may be easily accessed and content of the file may also be easily checked.

In detail, when the user inputs his or her account information to the image forming apparatus 100 or NFC-tags an NFC chip for identification of the user, the image forming apparatus 100 may display various information items associated with the user. In some embodiments, user authentication may be performed via various methods other than the NFC tag method.

In detail, as illustrated in FIG. 15, the user interface window 1500 may include a function control menu 1510 for receiving selection of a function of an image forming apparatus, a user portal region 1520, a cloud file region 1530, and a terminal apparatus file region 1540.

The user portal region 1520 is a region for displaying widget information that is pre-registered by the user. For example, the widget information may be associated with the number of printable papers of the user, weather, schedule, date, and so on.

The cloud file region 1530 is a region for displaying a file stored in a cloud server of a team to which the user belongs. In this case, the cloud file region 1530 may display a file pre-registered in a cloud server in the preview form. Here, the file displayed in the preview form may be a file that has been recently used by the user or a file with a high access frequency and that is, may be displayed in pre-registered order.

In response to any one from displayed files by the user, the corresponding selected file may be displayed on the image like in FIG. 13. When the user selects the cloud file region 1530 instead of a specific file, a higher number of various files stored in the cloud server may be displayed while enlarging and displaying the corresponding cloud file region 1530.

The terminal apparatus file region 1540 is a region for displaying a file stored in the terminal apparatus of the user. Here, the displayed file may be a file that has been recently used in the corresponding terminal apparatus by the user or a file with a high access frequency. In response to any one from displayed files by the user, an image like in FIG. 13 may be displayed. When the user selects the terminal apparatus file region 1540 instead of a specific file, the size of a current file region may be enlarged and only files stored in the terminal apparatus may be displayed to the user.

Likewise, even if the user does not move to the image forming apparatus, the user may easily obtain a desired file from a nearby image forming apparatus and may easily perform a printing operation on the file.

In order to protect information of the terminal apparatus, upon accessing a file stored in another terminal apparatus, the user may perform user authentication by inputting his or her account information to the image forming apparatus 100 or NFC tagging on a local area communication unit 112.

When there is typological error in the displayed document image and the document needs to be corrected, the user may select an edit function and correct the document, which will be described below with reference to FIG. 14.

Figure 16:
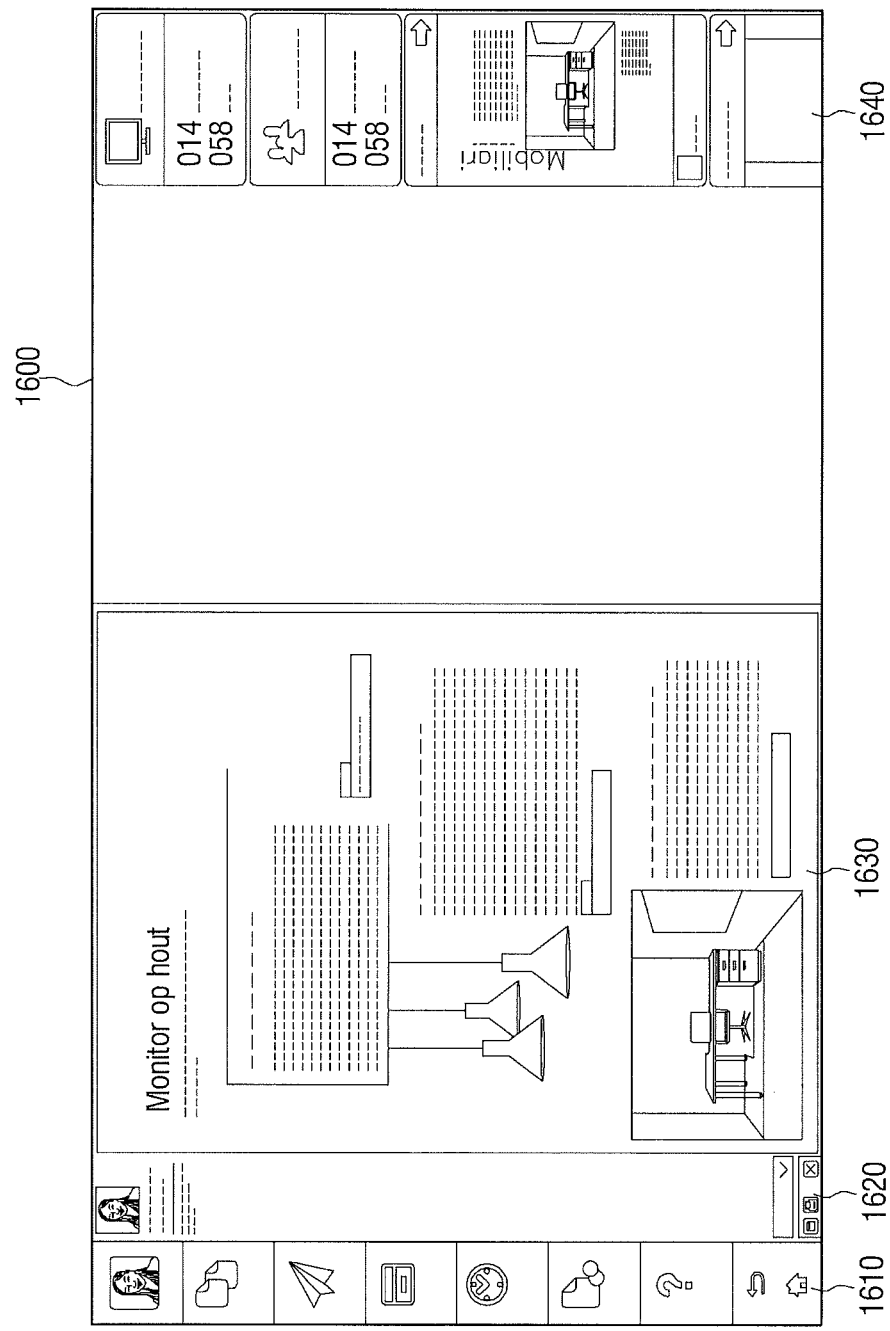

FIG. 16 illustrates an example of a user interface window 1600 for providing additional information.

Referring to FIG. 16, the user interface window 1600 includes a function control menu 1610 for receiving selection of a function of an image forming apparatus, a device display region 1620 for displaying a device selected by the user, a region 1630 for displaying a document image of the document selected by the user, and an additional information region 1640 for displaying additional information associated with the document selected by the user.

The additional information region 1640 is a region for displaying information according to data mining. In detail, the additional information region 1640 is a region for displaying information associated with the corresponding document with regard to the document selected by the user. For example, in response to a manual of a specific device being selected by the user, the additional information region 1640 may display a user manual of another device in the preview form or display other files having a name corresponding to the corresponding specific device in the preview form.

Figure 17:
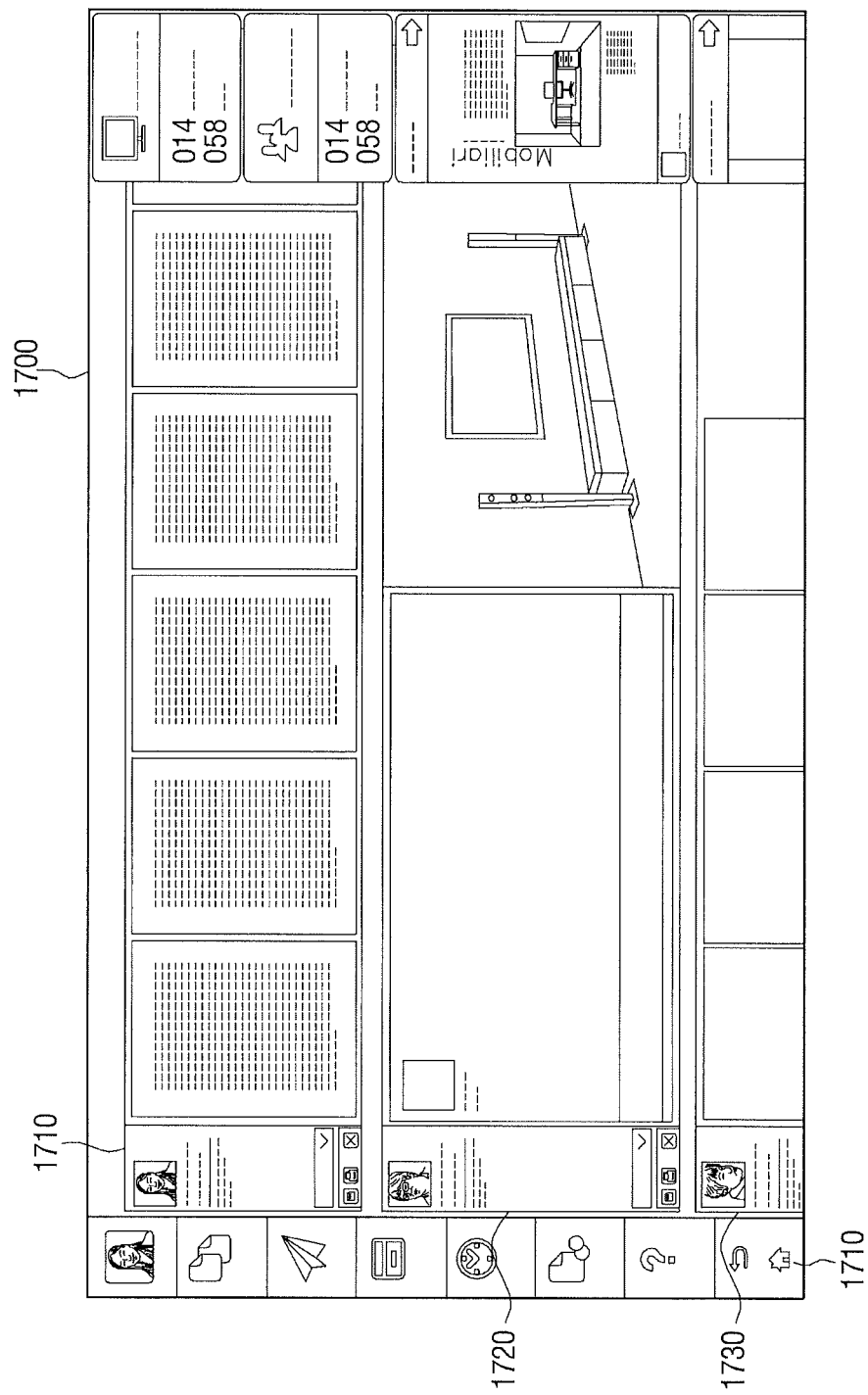

FIG. 17 illustrates an example of a user interface window 1700 for simultaneously displaying a plurality of documents.

Referring to FIG. 17, the user interface window 1700 may include a function control menu 1710 for receiving selection of a function of an image forming apparatus, and regions 1710, 1720, and 173 for displaying document information about a plurality of users.

In detail, when a plurality of users have a meeting together at the image forming apparatus, document information about each user may be simultaneously displayed on the display unit 120. As such, the users may easily collect data items of various documents in one place.

Figure 18:
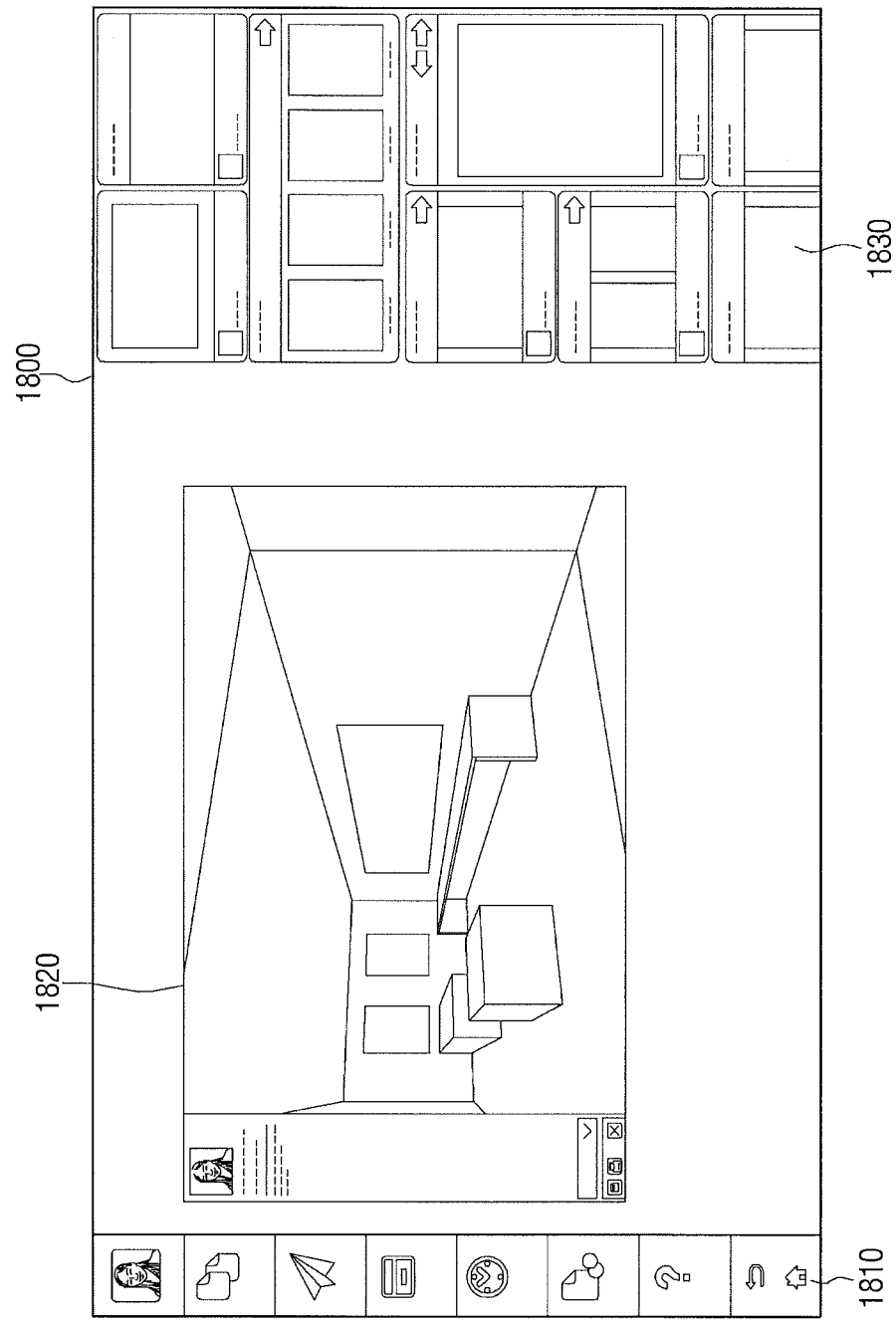

FIG. 18 illustrates an example of a user interface window 1800 for providing an advertisement function.

Referring to FIG. 18, the user interface window 1800 includes a function control menu 1810 for receiving selection of a function of an image forming apparatus, an advertisement display region 1820, and a region 1830 for displaying additional information associated with advertisement.

When the image forming apparatus is positioned in a public place such as a government office, a university, and so on, the image forming apparatus 100 may display advertisement while a printing process is not performed. The user may easily acquire information about an advertised product through the additional information together with the displayed advertisement. In some embodiments, the function of the image forming apparatus, such as a printing or copy function may be provided to the user in return for access to the advertisement.

Figure 19:
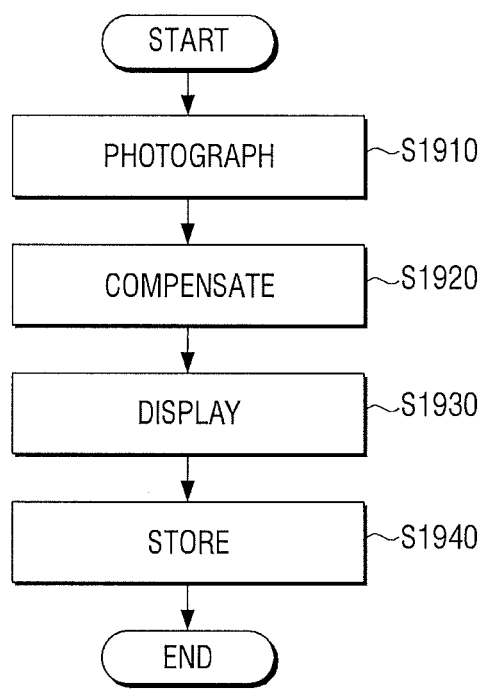
FIG. 19 is a flowchart for explanation of a method for controlling an image forming apparatus according to an embodiment.

FIG. 19 is a flowchart for explanation of a method for controlling an image forming apparatus according to an embodiment.

Referring to FIG. 19, a document positioned between a body portion and a display unit is scanned (S1910). In detail, in response to a scan function being selected by a user, the document in a scan space may be photographed using an imaging device.

In addition, distortion of the scanned image is compensated for (S1920). In detail, distortion due to a wide angle lens may be compensated for from the scan image acquired through the wide angle lens. When the image forming apparatus does not include a wide angle lens, the distortion compensation process may be omitted, and the distortion compensation may be performed only when scan is not always performed and a scan image is generated when a scan command is input.

The scan image with corrected distortion is displayed with an actual size of a document (S1930). In detail, the scanned scan image may be displayed with the actual size of the document on a display unit disposed on the body portion to be spaced apart from the body portion at a predetermined interval.

In addition, in response to a scan command being input while the document is displayed, the scanned image may be stored (S1940). In detail, the scan image acquired by the imaging device may be stored in preset format. The stored scan image may be transmitted to a terminal apparatus or a server.

Accordingly, in the method for controlling the image forming apparatus according to an embodiment, since a document in a scan space is displayed in a display unit in real time, a shape of the generated scan image may be easily predicted, and since a scan image is displayed with an actual size of the document, the use may easily recognize content of the document and easily edit the document. The control method of FIG. 19 may be performed by the image forming apparatus 100 including the components of FIG. 1 or performed by an image forming apparatus including other components.

The aforementioned method for controlling the image forming apparatus may be embodied as a program including an algorithm that is executable by a computer and the aforementioned program may be stored and provided in a non-transitory computer readable medium.

The non-transitory computer readable media refers to a medium that semipermanently stores data and is readable by a device instead of a medium that stores data for a short time period, such as a register, a cache, a memory, etc. In detail, the aforementioned programs may be stored and provided in the non-transitory computer readable media such as CD, DVD, hard disc, blue ray disc, USB, a memory card, ROM, etc.

The foregoing exemplary embodiments and advantages are merely exemplary and are not to be construed as limiting the disclosure. Also, the detailed description is intended to be illustrative, and not to limit the scope of the claims, and many alternatives, modifications, and variations will be apparent to those skilled in the art.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. An image forming apparatus, comprising:
   a body portion;
   an image forming unit, disposed in the body portion, configured to print data;
   a display having a screen on an upper side of the display facing away from an upper side of the body portion, the upper side of the display configured to be substantially horizontally disposed based on a paper sheet, and a lower side of the display being disposed above the body portion so as to be spaced apart from the body portion at a predetermined interval; and
   a scan unit, disposed on the lower side of the display, configured to scan the paper sheet disposed on the upper side of the body portion,
   wherein
   the display is further configured to display the scanned paper sheet as a document captured by the scan unit.

2. The image forming apparatus as claimed in claim 1, wherein the display displays the document captured by the scan unit in real time.

3. The image forming apparatus as claimed in claim 2, further comprising a controller to control storage in a storage unit of the document captured by the scan unit in response to a scan command being input to the image forming apparatus.

4. The image forming apparatus as claimed in claim 1, wherein the predetermined interval is 100 mm to 200 mm.

5. The image forming apparatus as claimed in claim 1, wherein the body portion comprises a container to store a paper.

6. The image forming apparatus as claimed in claim 1, wherein
   the body portion comprises a discharger disposed on a left or right side of the body portion, and
   the discharger discharges a printout.

7. The image forming apparatus as claimed in claim 1, further comprising a second scan unit disposed in the body portion, wherein the second scan unit automatically feeds a second document placed in a document loader disposed on a left or right side of the body portion and scans the second document.

8. The image forming apparatus as claimed in claim 1, wherein the scan unit further comprises a wide angle lens and the scan unit scans the paper sheet through a wide angle lens.

9. The image forming apparatus as claimed in claim 8, further comprising an image processor which compensates for distortion of a scan image generated by the scan unit scanning the paper sheet.

10. The image forming apparatus as claimed in claim 1, wherein the display is disposed such that the upper side of the display is inclined to one side based on the paper sheet.

11. The image forming apparatus as claimed in claim 1, wherein the display is rotatably connected to the body portion.

12. The image forming apparatus as claimed in claim 1, wherein an image display region of the display is greater than an A3 paper.

13. The image forming apparatus as claimed in claim 1, wherein the scan unit scans the paper sheet to generate a scanned image and the display displays the scanned image including displaying an actual size of the paper sheet.

14. The image forming apparatus as claimed in claim 1, further comprising a manipulation input unit configured to receive selection of a file stored in at least one of a storage unit in the image forming apparatus, a server, and a terminal apparatus,
   wherein the display displays a document image corresponding to the selected file.

15. The image forming apparatus as claimed in claim 14, further comprising:
   a manipulation input unit which receives an edit command for a document image displayed on the display; and
   an image processor which edits the document image according to the received edit command.

16. The image forming apparatus as claimed in claim 14, further comprising a communication interface unit configured to receive additional information corresponding to the selected file from at least one of the storage unit, the server, and the terminal apparatus,
   wherein the display displays the received additional information together with the document image.

17. The image forming apparatus as claimed in claim 1, wherein the display displays at least one of a function control menu for performing a function of the image forming apparatus, and pre-registered known information.

18. The image forming apparatus as claimed in claim 1, further comprising:
   a communication interface unit configured to receive data from a terminal apparatus; and
   a controller to control the image forming unit to print the received data while performing a scan operation of the scan unit or a display operation of the display.

19. An image forming apparatus, comprising:
   a body portion having an upper side horizontally disposed, a bottom side horizontally disposed, and left and right sides vertically disposed and connecting the lower and bottom sides;
   an image forming unit, disposed in the body portion, configured to print data;
   a display portion, including:
      a connection part connected to the upper side of the body portion to project upward from the upper side of the body portion,
      an extension part that extends from the connection part and over the upper side of the body portion such that the extension part is spaced apart from the upper side of the body portion in a vertical direction, a scan unit, disposed on a lower side of the extension part of the display portion so as to face the upper side of the body portion, configured to scan a document disposed on the upper side of the body portion, and a screen on an upper side of the display portion facing away from the upper side of the body portion, configured to display a scan image generated when the scan unit scans the document.

20. The image forming apparatus of claim 19, wherein the body portion includes:

a document loader disposed on at least one of the left and right side of the body portion, and a second scan unit, disposed in the body portion, configured to automatically feed a second document placed in the document loader and to scan the second document.

* * * * *

UNITED STATES PATENT AND TRADEMARK OFFICE
CERTIFICATE OF CORRECTION

PATENT NO. : 9,888,146 B2  
APPLICATION NO. : 14/737747  
DATED : February 6, 2018  
INVENTOR(S) : Sang-in Lee et al.

Page 1 of 1

It is certified that error appears in the above-identified patent and that said Letters Patent is hereby corrected as shown below:

On the Title Page (72), Delete "Kellch" and insert -- Keiich --.

Signed and Sealed this
Twenty-first Day of August, 2018

Andrei Iancu
*Director of the United States Patent and Trademark Office*